(12) United States Patent
Yu (10) Patent No.: US 7,107,450 B1
(45) Date of Patent: Sep. 12, 2006

(54) CONTENT-BASED AUTHENTICATION OF GRAPH PRESENTED IN TEXT DOCUMENTS

(75) Inventor: Hong Heather Yu, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/429,470

(22) Filed: Oct. 28, 1999

(51) Int. Cl.
*H04L 9/00* (2006.01)

(52) U.S. Cl. .................... 713/176; 380/54; 705/57; 358/3.28; 358/405; 358/464; 382/112; 382/113; 399/366

(58) Field of Classification Search ............. 380/54; 705/57, 176; 713/176; 382/112, 113; 340/5.86, 340/5.8; 356/71; 399/12, 366; 283/73, 283/902; 358/3.28, 526, 405, 464; 285/73, 285/902

See application file for complete search history.

(56) References Cited

U.S. PATENT DOCUMENTS

| | | | | |
|---|---|---|---|---|
| 5,191,438 | A * | 3/1993 | Katsurada et al. | 382/290 |
| 5,335,290 | A * | 8/1994 | Cullen et al. | 382/176 |
| 5,606,626 | A * | 2/1997 | Kim et al. | 381/345 |
| 5,883,973 | A * | 3/1999 | Pascovici et al. | 382/176 |
| 6,408,330 | B1 * | 6/2002 | DeLaHuerga | 709/217 |
| 6,678,392 | B1 * | 1/2004 | Powell et al. | 382/100 |

OTHER PUBLICATIONS

John Clarkson, "Converting Excel 97 Data to HTML," Microsoft Excel 97 Technical Articles, Microsoft Corp. Jul. 1998, pp. 1-3.*

A Secure, Robust Watermark for Multimedia, I.J. Cox, J. Kilian, T. Leighton, T. Shamoon, Info Hiding 96, pp. 1-16.

A review of watermarking and the importance of perceptual modeling, Ingemar J. Cox and Matt L. Miller, Human Vision and Electronic Imaging II, SPIE 3016, San Jose CA, USA, Feb. 1997.

Fragile imperceptible digital watermark with privacy control, C.W. Wu, D. Coppersmith, F.C. Mintzer, C.P. Tresser, IBM Thomas J. Watson Research Ctr., M.M. Yeung, Electronic Imaging '99, Security and watermarking of multimedia content, SPIE 3657, Jan. 1999, pp. 79-84.

Electronic Marking and Identification Techniques to Discourage Document Copying, J. Brassil, S. Low, N. Maxemchuk, L. O'Garman, IEEE Infocom 94.

(Continued)

*Primary Examiner*—Emmanuel L. Moise
*Assistant Examiner*—Paul Callahan
(74) *Attorney, Agent, or Firm*—Harness, Dickey & Pierce, PLC (57) ABSTRACT

A system and method provide for content-based authentication of binary graphs. The method includes the step of receiving an electronic file having a graphical content. An object level representation of the graphical content is then generated and authentication information is added to the electronic file based on the object level representation. The method further provides for authenticating the object level representation with a text authentication algorithm. Thus, by building a bridge from graphs to text at the character level, the present invention allows authentication of graphs using suitable text document authentication algorithms. When pixel level precision of the graph is required, a pixel level authentication can be added. This layer lets the owner detect as well as localize changes in the graph at the pixel level. Both levels of authentication are optional depending on the application.

15 Claims, 12 Drawing Sheets

OTHER PUBLICATIONS

Hiding Information in Documents Images, J. Brassil and S. Low and N.F. Maxemchuk and L. O'Gorman, Conference on Information Sciences and Systems (CISS-95), Mar. 1995.

Marking and detection of text documents using tranform-domain techniques, Y, Liu, J. Mant, E. Wong, S. Low, Electronic Imaging '99. Security and watermarking of multimedia content, SPIE 3657, Jan. 1999, pp. 317-328.

Techniques for Data Hiding, W. Bender, D. Gruhl, N. Morimoto, A. Lu, IBM Systems Journal v 35 No. 3-4 (96), pp. 313-336.

Digital Watermarks for Audio Signals, L. Boney, A.H. Tewfik, K.N. Hamdy, IEEE International Conference on Multimedia Computing and Systems, Hiroshima, Japan Jun. 17-23, 1996, pp. 473-480.

Robust MPEG Video Watermarking Technologies, J. Dittmann, M. Stabenau, R. Steinmetz, Multimedia 98, pp. 71-80.

Issues and solutions for authenticating MPEG video, C.Y. Lin, S.F. Chang, Electronic Imaging '99. Security and watermarking of multimedia content, SPIE 3657, Jan. 1999, pp. 54-65.

* cited by examiner

| Relationship symbols | |
|---|---|
| < > | a tuple |
| ∩ | and |
| ∪ | or |
| ≠ | not |
| → | parent → child |
| ⇒ | sibling relation |
| ⇔ | twin relation |
| ← | child ← parent |
| > | contain relation |
| \| | condition |
| . | . |
| . | . |
| . | . |
| : | unconnected |
| Specification symbols | |
| & | size |
| # | shape |
| @ | position |
| © | color |

*Fig-13*

The system flow diagram is illustrated below. It shows the simplicity of the algorithm... "<N1{'Process A', #1, ®, @mid}→N2{'Process B', #1, ®, @mid}→N3{'If C', #3, ®, @mid}→<N4{'End', #2, ®, @mid}|yes; N2|no>>"

| (Text) | W/o content-dependent one way hash | | | Our algorithms, w/ content-dependent one way hash | | | Duel level with coalescing |
|---|---|---|---|---|---|---|---|
| | Traditional line spacing | Traditional serif length | | Coalescing | Object level | | |
| Special coding | Needed | Needed | | May or may not needed | May or may not needed | | May or may not needed |
| Imperceptibility | Good | Good | | OK | Good | | Good |
| Detectability | Bad | Bad | | OK | Good | | Good |
| Pixel-level detectability | Bad | Bad | | Good if Method I OK if Method II | Can't detect | | OK |
| Localization-ability | Bad | Some bad. Some OK | | Good if Method I, bad if Method II | Good | | Good |
| Copy and print | Bad | Bad | | Good if Method I, bad if Method II | Good | | Good |
| Noise resistance-ability | Bad | OK | | Good if Method I, bad if Method II | Good | | Good |
| Robustness to scaling | Good | OK | | Good if Method I, bad if Method II | Good | | Good |

*Fig-18*

Fig-16 auth
(a) Original size auth
(b) Enlarged

↧ yes
(c) Original size

↧ yes
(d) Enlarged

Fig-17

CONTENT-BASED AUTHENTICATION OF GRAPH PRESENTED IN TEXT DOCUMENTS

BACKGROUND OF THE INVENTION

1. Technical Field

The present invention relates generally to document authentication. More particularly, the present invention relates to the authentication of graphs at the object level as well as the pixel level.

2. Discussion

For as long as humans have communicated with one another, there has been concern over maintaining confidentiality. As a result, verbal, written, and electronic messages have all been the subject of substantial technological efforts to maintain security. For example, document authentication techniques are commonly used to ensure the integrity of a wide variety of electronic documents such as, presentations, contracts, military orders, and databases. Authentication involves the task of making the determination that the document has not been tampered with and that it originated with the presumed transmitter. Authentication using digital watermarks is a particular technique that has been studied by many researchers in the last ten years. For example, digital watermarking has been successfully applied to digital documents such as digital color/gray scale images and plain text. While electronic document authentication efforts have experienced considerable success, it is important to note that these efforts have typically centered around the protection of textual documents and images.

Recently, however, more and more documents are using graphs in addition to images and text for system and idea illustration. In contrast to images, graphs are more difficult to watermark because of low capacity of additive noise. This is due to the binary nature of graphs. The term "binary nature" relates to the fact that most graphs have one bit per pixel, whereas most images have multiple bits per pixel to indicate varying shades and colors. Binary pixels make it particularly hard to insert watermarks due to the low capacity for perceptual invisible noise. In other words, a minimal alteration of bits in a binary graph can result in a substantial change in the appearance and content of the graph. Furthermore, the critical information of a graph is often contained at the object level rather than the pixel level. For example, a useful application for document copying and copyright protection is to provide different levels of access to different users. In such a case it would be very desirable to detect alteration of the original document as well as localize the alteration on the object level. For example, it is more important to detect a substantive change in a document, such as "10%" to "70%", than it is to detect an increase in the size of an arrow by one pixel. Thus, the sensitive information in a document is often contained on the object level rather than the pixel level.

Pixel level authentication may also result in less flexibility. For example, if the annotation font of a graph changes but the content of the graph does not, pixel level authentication will alert the owner that the annotations have been altered. The owner has no way of determining, however, that the content of the graph matches the original. Object level authentication, on the other hand, would assure the owner that the "content is authentic" in such a case. If the font is marked as sensitive information, object level authentication could also alert the owner to font alterations. In many applications, however, it would be highly desirable to provide a mechanism for returning an "authentic" determination if the font is not marked as sensitive information.

Conventional methodologies for content-based text authentication mainly rely on altering the word/line spacing or the length of character vertical serif strokes. While text documents are often referred to as binary images and share the same binary nature of graphs, these methodologies can hardly be extended to authentication of graphs. This is because even on the pixel level graphs generally do not exhibit the same characteristics as text. For instance, in a graphical flowchart the shape of each node may be very important, whereas the nodes often have substantially fewer characters as compared to a paragraph of text. In such a flowchart the number of objects that exhibit a vertical serif can be as low as a few percent of the total number of objects. Here, an object is referred to an alterable line, character, or curve. In fact, other kinds of graphs may not exhibit alterable line spacing or vertical serif at all. It is therefore desirable to bridge text-based authentication techniques to the authentication of graphs.

SUMMARY OF THE INVENTION

The above and other objects are provided by a computerized method for authenticating a document. The method includes the step of partitioning the document into graphical content and textual content. The graphical content is then converted into a symbolic representation of the graphical content. The method further provides for authenticating the symbolic representation with a text authentication algorithm.

The present invention also provides a computerized method for authenticating a binary graph. The graph is authenticated at the pixel level as well as the object level. The method includes the step of encrypting the authenticated graph.

As a further aspect of the invention, a graph authentication system has an object level authenticator for authenticating a graph at an object level. The authentication system further includes a pixel level authenticator for authenticating the graph at a pixel level and an encryption system for encrypting the authenticated graph.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENT

Figure 1:
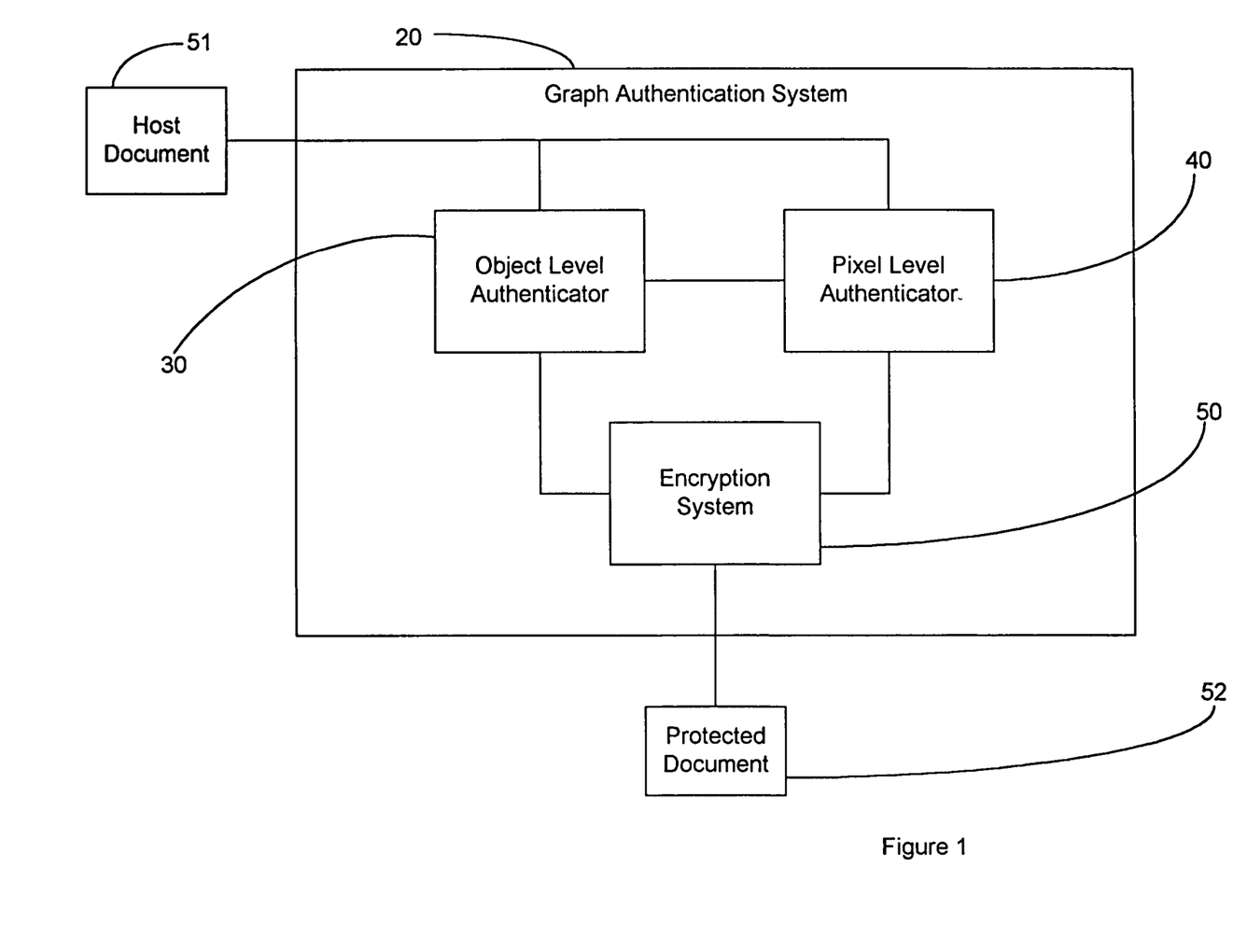
FIG. 1 is a block diagram of a graph authentication system according to the present invention.

Turning now to FIG. 1, the preferred embodiment of the graph authentication system 20 includes an object level authenticator 30, a pixel level authenticator 40, and an encryption system 50. The graph authentication system 20 provides for content-based authentication of graphs contained in a host document 51. The result is protected document 52. As part of the following discussion, I is defined to be the host document 51, such as a contract, which will be authenticated by owner O1 or owners O1, O2 to On. The authenticated copy of host document I is denoted as Î. In correspondence, G and Ĝ are defined to be the original and the authenticated copy of a graph respectively. Furthermore, R is defined as an authorized receiver, whereas A is an attacker, i.e., unauthorized receiver. The following scenarios illustrate potential applications and objectives of graph authentication system 20.

The first scenario is the situation in which $I_1 \in O1$, O1 wants to determine whether her document $I_1$ is authentic. The content of the document contains sensitive information, such as a price of $1,000 or a deadline of Jun. 1, 1999. Another scenario occurs when $I_1 \in O1$, O1 needs to send $I_1$ to R and wishes to grant R "read" permission but not "write" permission. A variation on this scenario is the situation in which O1 wants to prevent alteration of any kind and to localize the alterations made by an attacker A who gets $I_1$ from O1 and then sends it to R. Or, O1 may want everyone to be able to read $I_1$ while only herself and R can make modification on the document. Another scenario occurs when $I_1 \in O1 \cap O2$, i.e., $I_1$, is a contract between O1 and O2. If the copy in O1's hand is different from that of in O2's, O1 wants to prove that O2's copy is a tampered copy of the original contract by checking the authenticity of O2's copy. In addition, O1 may want to point out where exactly O2 altered the original contract.

Figure 11:
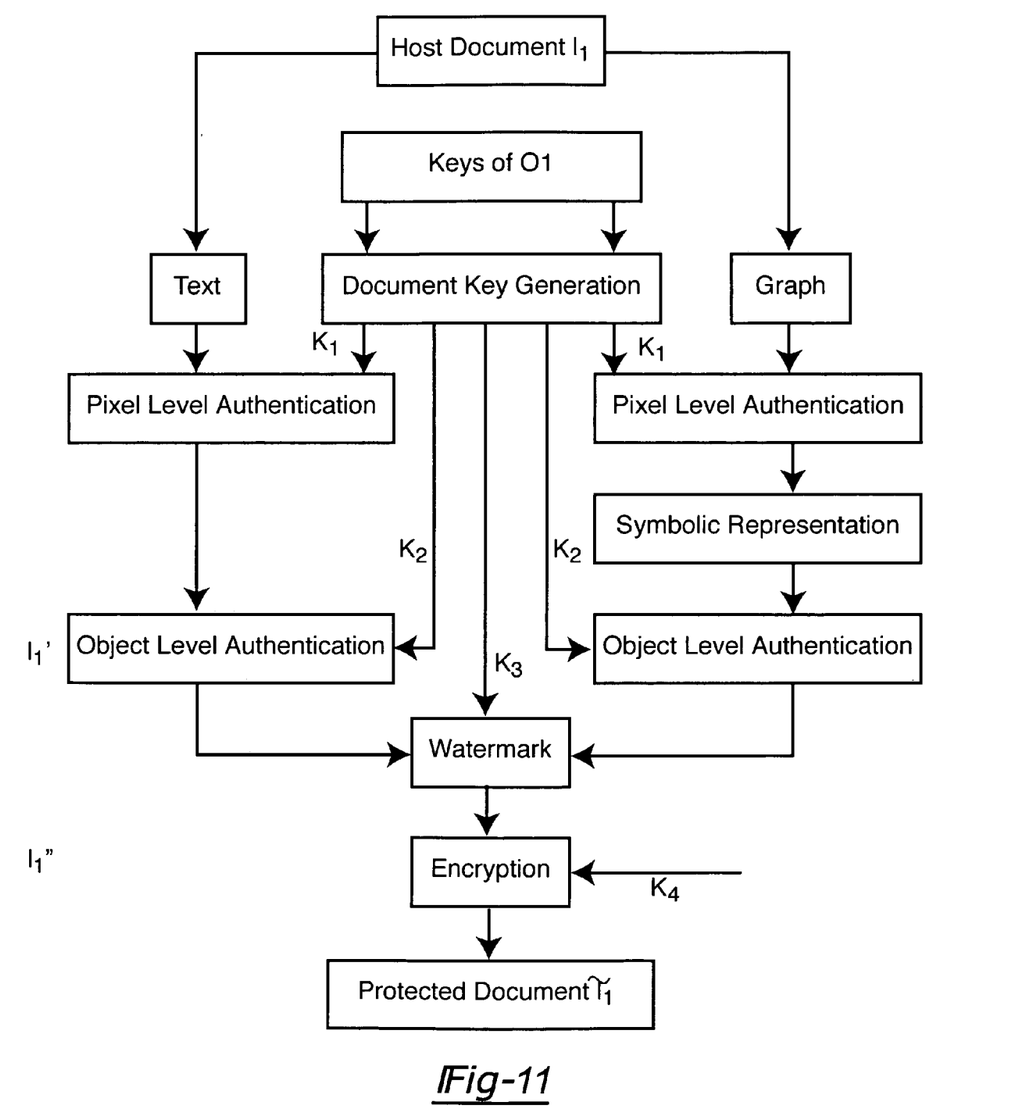
FIG. 11 is a block diagram of a one-party owned document authentication process according to the present invention.

Turning now to FIG. 11, it can be appreciated that the present invention provides a fully functional content-based authentication system for text documents including binary graphs. By building a bridge from graph to text on the character level, the present invention allows authentication of graphs using suitable text document authentication algorithms. When pixel level precision of a graph is required, a pixel level authentication can be added. This layer lets the owner detect as well as localize changes in the graph on the pixel level. The hierarchical layout allows the application of the present invention to the aforementioned scenarios as well as other scenarios.

The first level of the hierarchy is the pixel level authentication which is followed by an object level authentication. These are done with owner O1's private key. Notice here, either the pixel level or the object level protection is optional depending on the application. For ultimate protection, however, a dual-layer protection with a pixel protection layer plus an object protection layer is recommended since the two layers are orthogonal. Additionally, a meaningful watermark, such as a company logo, can be inserted, if desirable, into the document. Furthermore, the authenticated documents, including text and graphs can be encrypted with a public key encryption algorithm for secure transmission. Here the watermarking layer can be done either before or after the authentication layer. This again, depends on different applications. Access authorization can then be granted by distributing different keys to different users. For example, in the case of "read" only access, R will be given the public decryption key $K_4$ only. In the case of a multi-party owned document authentication, each party has a private key, the authentication is done by generating a key set with the private key from every party (see FIG. 12). Attempted modifications of the document without a key will therefore be unsuccessful.

Figure 2:
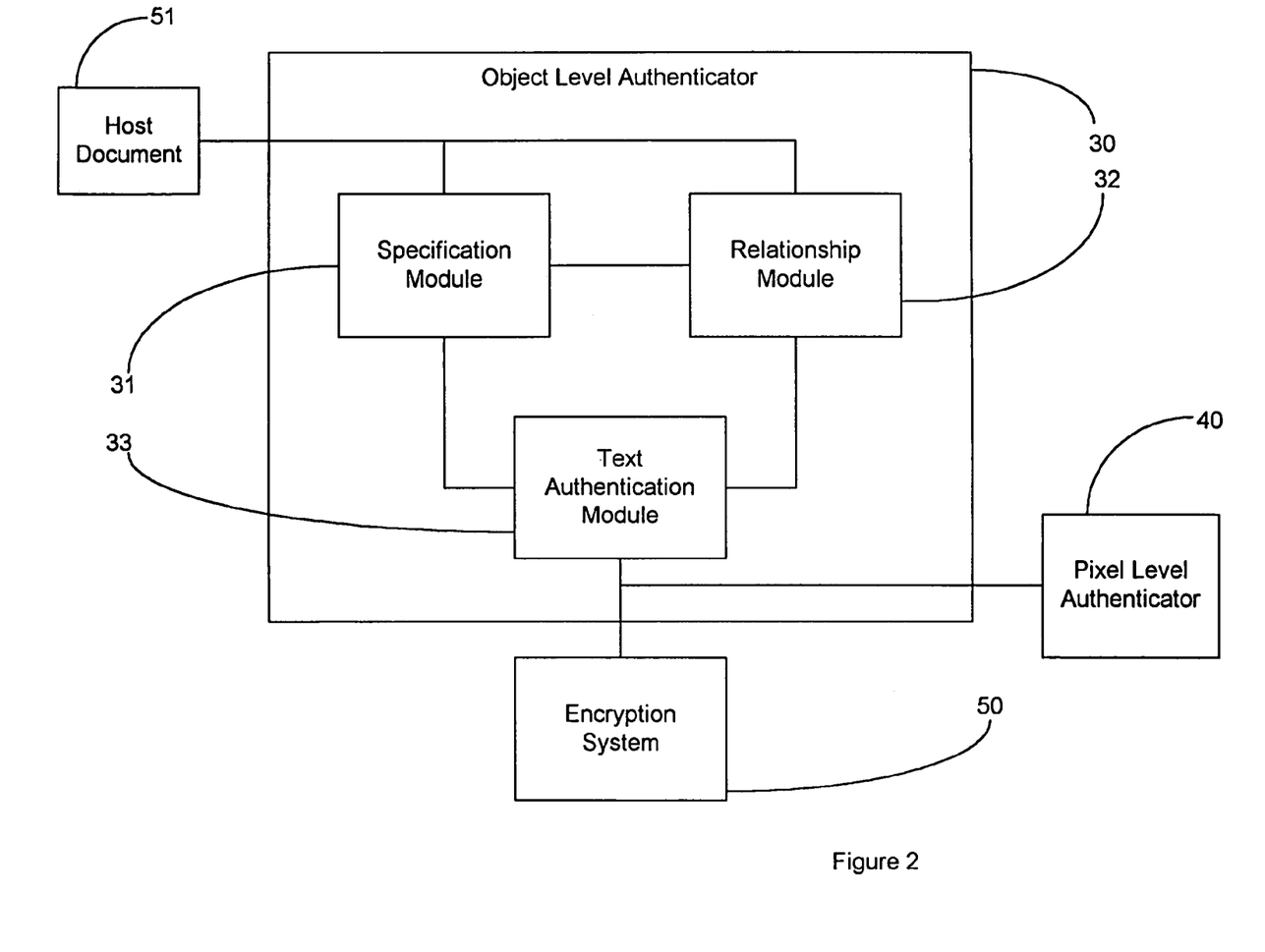
FIG. 2 is a block diagram of an object level authenticator according to the present invention.

Returning to FIG. 1, it will be appreciated that the object level authenticator 30 authenticates the graph at an object level, whereas the pixel level authenticator 40 authenticates the graph at a pixel level. The encryption system 50 encrypts the authenticated graph for transmission to the recipient. As seen in FIG. 2, it will be appreciated that the object level authenticator 30 converts the graph into a symbolic representation of the graph via a specification module 31 and a relationship module 32. The specification module 31 defines nodes of the graph with specification symbols. Similarly, the relationship module 32 defines relationships between the nodes of the graph with relationship symbols. This allows a text authentication module 33 to authenticate the symbolic representation with a text authentication algorithm.

FIG. 9 demonstrates the various types of graphs which can be authenticated via the present invention. The operation of the object level authenticator 30 can be better understood through the graphical flowchart of FIG. 10. It can be appreciated that the important information contained in graphical flowchart 34 is the annotation of each node and the connections between nodes that illustrate the relationship of nodes. Whether the drawing of each box is slightly smaller or slightly larger, the length of a line is longer or shorter, or the position of a node is tilted to the left or right is generally not as important. Consequently, the authentication process is mainly concerned with the object level instead of the pixel level of the graphical flowchart 34. It is important to note that the important characteristics of an object depend on the type of graph. Thus, in the case of the bar chart of FIG. 9(c), the important information is contained in the relative height of each individual bar rather than the overall height of the graph. For example, if the height of the second bar is changed to half its original height, the value of the second bar is thereby altered. It will be appreciated that the concern with most text documents is at the object level, or character level.

Figure 10:
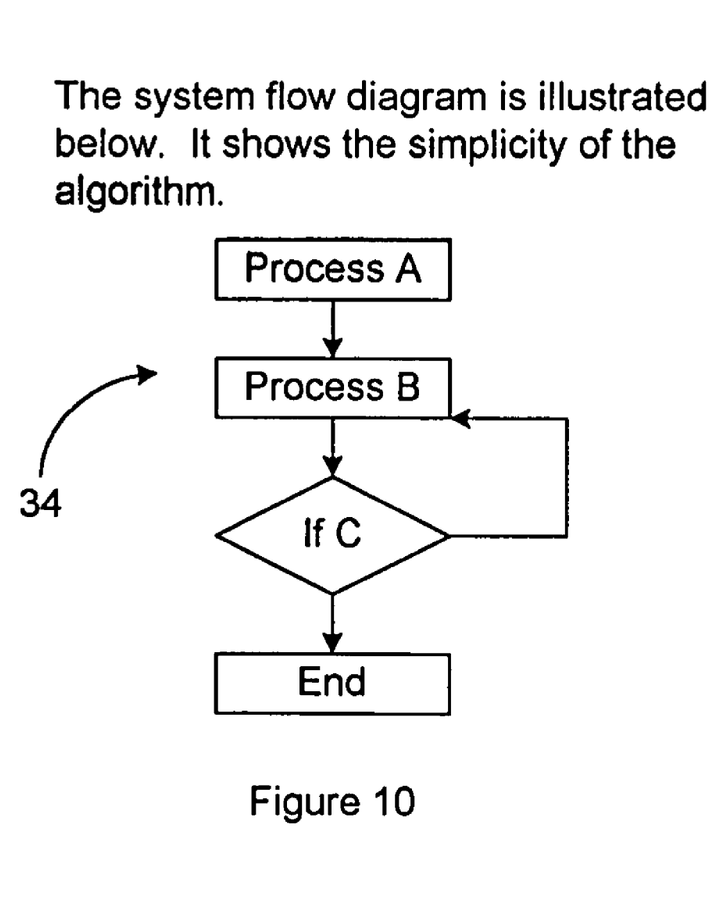
FIG. 10 is an illustration of a graphical flowchart which can be authenticated with the present invention.
Figure 13:
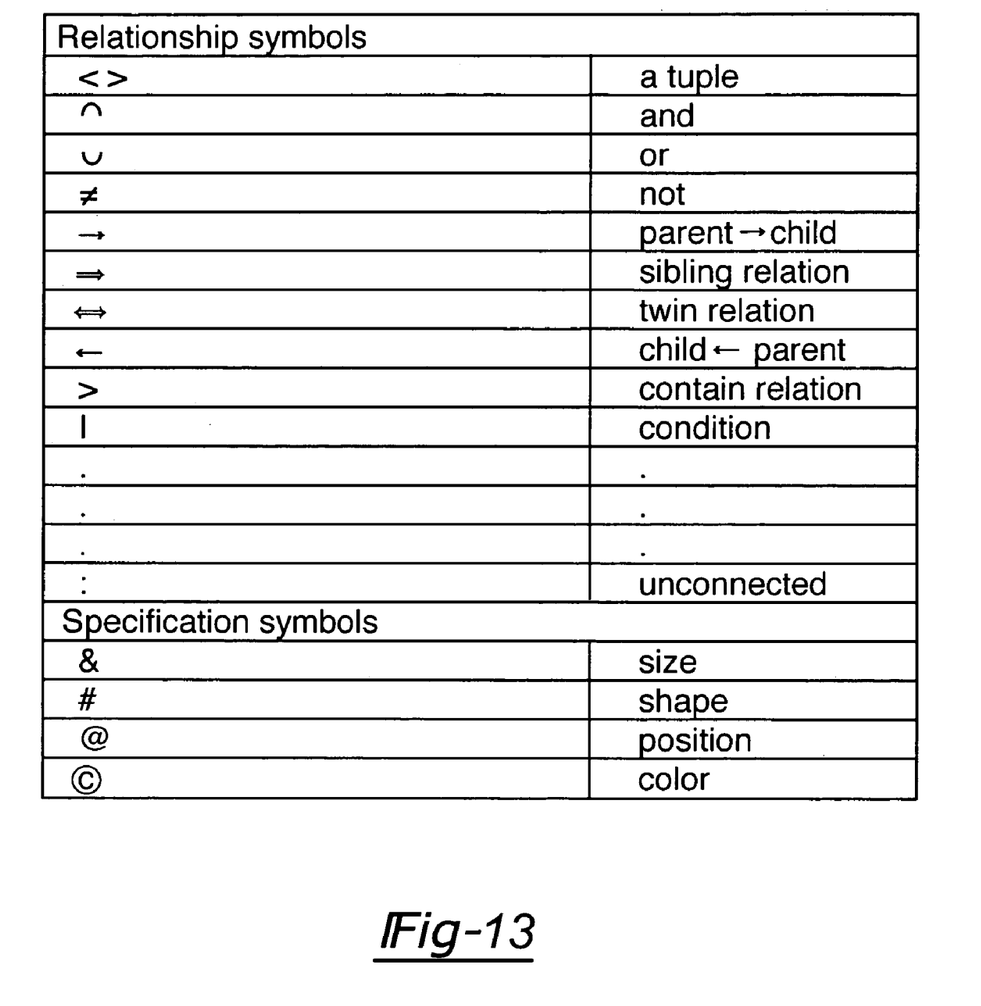
FIG. 13 is a table of relationship and specification symbols according to a preferred embodiment of the present invention.
Figure 14:
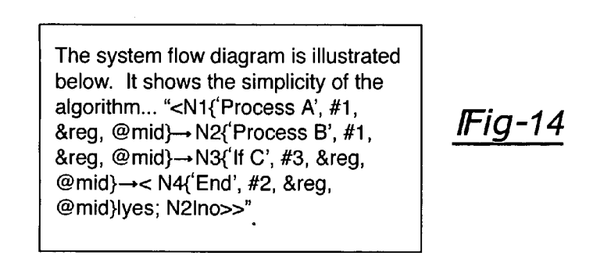
FIG. 14 is a symbolic representation of the graphical flowchart of FIG. 10.

Graphical flowchart 34 therefore includes various nodes and lines and can be represented with a series of relationship symbols along with the node annotations as follows: "<N$_1$ {'Process A', #1, ®, @mid}→N$_2$ {'Process B', #1, ®, @mid}→N$_3$ {'If C', #3, ®, @mid}→<N$_4$ {'End', #2, ®, @mid}|yes; N$_2$|no>>", wherein FIG. 13 illustrates the relationship and specification symbols for the above symbolic representation. The result is shown in FIG. 14. In the above symbolic representation, N$_1$ N$_2$ ... are node names with the property of each node contained in { }, < > is a tuple, and → and | are relationship symbols. It will be appreciated that the properties of nodes and lines, the shape, size, color, and position, can be described with the specification symbols. For those specification insensitive graphs, the symbols between each pair of { } can be simply ignored whereas in specification sensitive graphs, the specification symbols in each pair of { } provide different levels of details. This hierarchical representation provides additional flexibility.

After defining the nodes of the graph with specification symbols, and the conditions and familial relationships with relationship symbols, the text authentication module 33 can authenticate the symbolic representation. For example, well known two- or multi-dimensional checksum techniques can be used to verify authenticity. For the following discussion, let T(p,q) represent the (p,q)th character. S(p,q)=s$^1$(p,q) s$^2$(p,q) ... s$^J$(p,q)=f(T(p,q)) is the coded representation of T(p,q) via map f, wherein s$^1$(p,q) s$^2$(p,q) ... s$^J$(p,q) represent the first, the second, ... and the Jth bit of S(p,q) that are in the order of the most significant bit to the least significant bit. Furthermore, let Sum$_p^j$=Σ$^P_{p=1}$s$^j$(p,q) and Sum$_q^j$=Σ$^Q_{q=1}$ s$^j$(p,q), where P & Q are dimensional sizes. Thus, the position (p,q) of any alteration Sum$_p$'≠Sum$_p$, Sum$_q$'≠Sum$_q$ can be localized.

Figure 12:
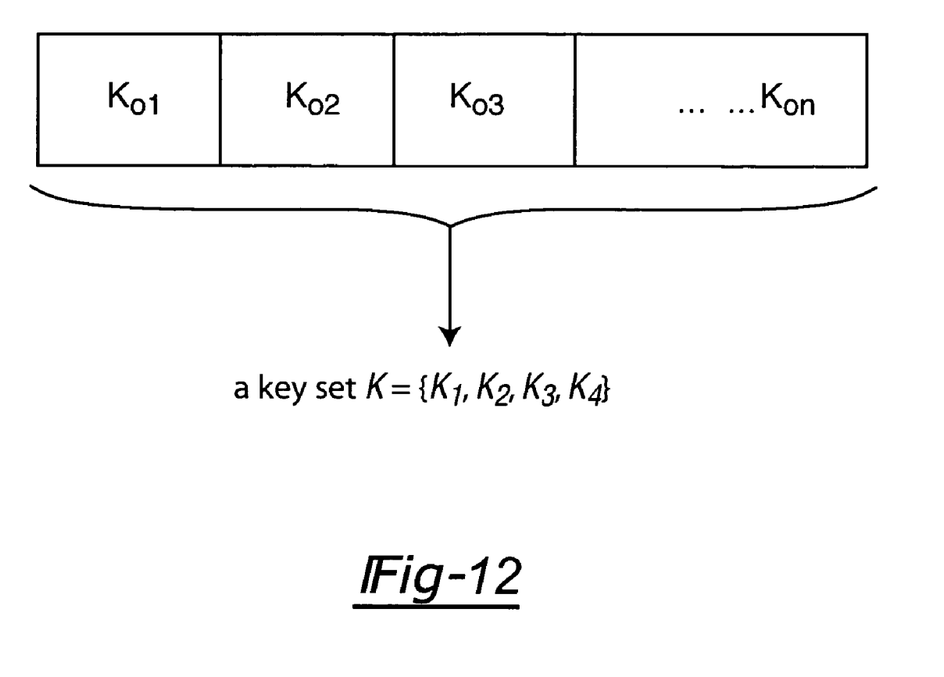
FIG. 12 is an illustration of a key set according to the present invention.

It will be appreciated that utilizing well known content-dependent one way hash functions provides a higher level of security. For the following discussion, let B denote the block size and K denote a private key. In the case of a multi-party document, K is a function of K$_{O1}$, K$_{O2}$, ..., i.e., K=f1(K$_{O1}$, K$_{O2}$, ...). FIG. 12 illustrates a key set for the present example. For the purpose of discussion, we may assume each key in the set, K$_{o1}$, K$_{o2}$, ... to be encrypted with its owner's private key, and an arbitrator (a trusted third party) is used to generate the key set K. It is important to note, however, that other suitable cryptography protocols may also be used. Assume K is a Jbits coding with the 1$^{st}$ to (J–1)$^{th}$ bits being the code bits and the lowest bit, J$^{th}$ bit, being the verification bit. The document paragraph I shown in FIG. 14 can use 9 bits coding. Choosing the one way hash algorithm MD5, the encoding procedure is as follows. Pad the source text I to an exact multiple of 512 in length. For each 128-length set, I$_o$, choose its neighborhood set, L$_o$=512 characters with I$_o$⊂L$_o$. Assume $$S_o=\{S_o(i), i_\epsilon[1,128]\}=\{s^1_o(i)s^2_o(i) \ldots s^J_o(i)\}=f(I_o)$$

and $$\underline{S}_o=\{\underline{S}_o(i), i_\epsilon[1,512]\}=\{\underline{s}^1_o(i)\underline{s}^2_o(i) \ldots \underline{s}^J_o(i)\}=f(L_o)$$

are coded representation of I$_o$ and L$_o$ respectively.

1. Concatenate the code bits of the neighborhood set L$_o$,
2. Calculate the 128bits hash value of it, h$_o$=H(S$_o$),
3. Generate message h$_o$'=Sgn(K, h$_o$) by signing h$_o$ with public cryptography method, and
4. Put h$_o$' into the J$^{th}$ bit, the lowest bit, of S$_o$(i), i.e., let s$^J_o$(i)=h$_o$'(i), i$_\epsilon$[1,128].

The above algorithm is discussed in the context of image authentication in the article "Fragile imperceptible digital watermark with privacy control", C. W. Wu, D. Coppersmith, F. C. Mintzer, C. P. Tresser, and M. M. Yeung, IS&T/SPIE Conference on Security and Watermarking of Multimedia Content, SPIE 3657, January, 1999, incorporated herein by reference. The decoding process is similar to the encoding process with the verification done through an XOR operation. Such that Auth$_o$(i)=h$_o$'(i)⊕s$^J_o$(i).

If Auth$_o$(i)=1 for ∀i$_\epsilon$[1,128], the I$_o$ set has been altered.

Figure 3:
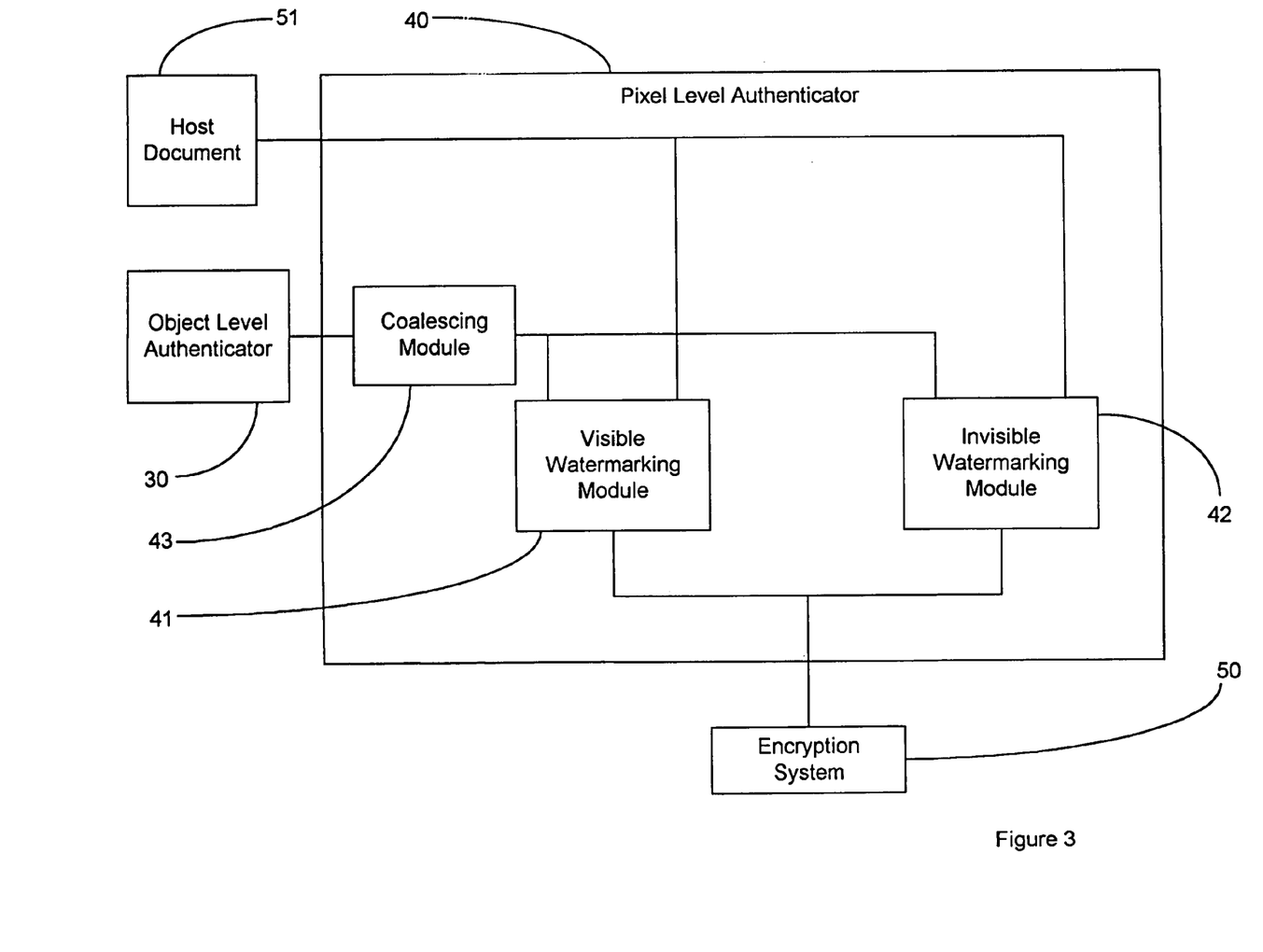
FIG. 3 is a block diagram of a pixel level authenticator according to the present invention.

Turning now to FIG. 3, the pixel level authenticator 40 of the graph authentication system 20 is shown in greater detail. It can be appreciated that a visible watermarking module 41 adds visible authentication information to the graph at the pixel level, whereas an invisible watermarking module 42 adds invisible authentication information to the graph at the pixel level. The preferred embodiment further includes a coalescing module 43 for embedding a hash value from the object level of the graph at the pixel level of the graph. Dual level authentication with coalescing has been found to yield optimum results. To authenticate I with N symbols, we compute the one way hash of I on the character level first. Therefore, if N=248 characters this is done by putting all the bits of the 248 characters together, pad the result to an exact multiple of 512 in length, and calculate the hash value of the padded message. Then, the 128 bits hash value is embedded at the pixel level.

Figure 4:
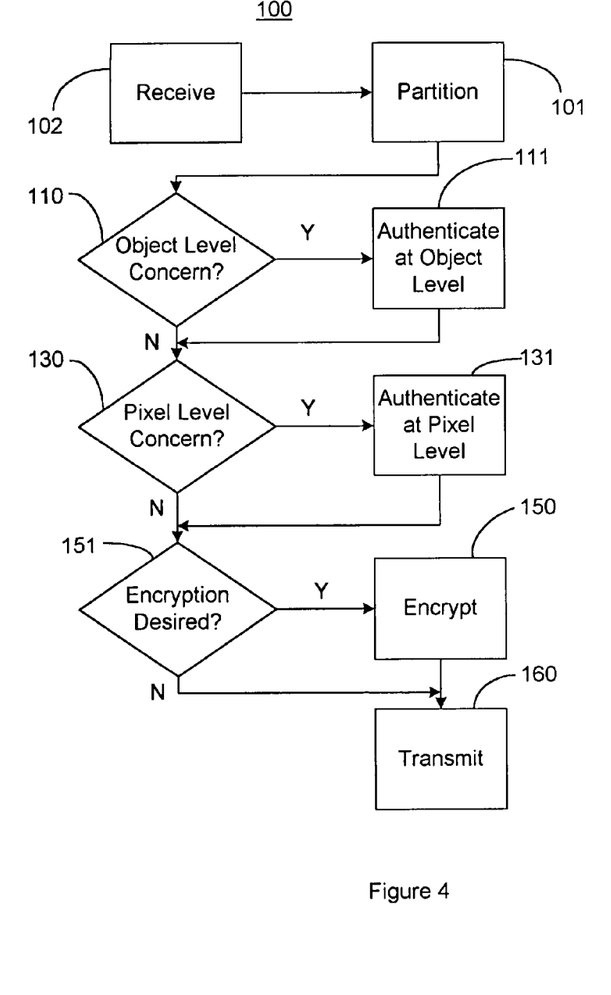
FIG. 4 is a flowchart of a computerized method for authenticating a document according to the present invention.

Operation of the graph authentication system of the present invention will now be described in greater detail for programming purposes. Turning to FIG. 4, a computerized method for authenticating an electronic file (or document) is shown generally at 100. Step 102 demonstrates receipt of the electronic file. At step 101, the file is partitioned into graphical content and textual content. The partitioning of graphs from text regions in a document has been the subject of considerable study. For example, U.S. Pat. No. 5,465,304, and U.S. Pat. No. 5,335,290 to Cullen, et al., incorporated herein by reference, discuss the segmentation of text, pictures, and lines of a document image. Furthermore, U.S. Pat. No. 5,073,953 to Westdijk, incorporated herein by reference, discloses a system and method for automatic document segmentation. The separation of body text from other regions of a document is taught in U.S. Pat. No. 5,892,843 to Zhou, et al., incorporated herein by reference. Also, in U.S. Pat. No. 5,379,130 to Wang, et al., a method and system that separates images from text is disclosed. Any of these techniques or other well known approaches can be readily adapted to perform partitioning step 101.

At step 110, it is determined whether the object level is a level of concern. If so, the graph is authenticated at the object level at step 111 by adding authentication information the electronic file based on an object level representation. Similarly, at step 130 it is determined whether the pixel level is a level of concern. If so, the document is authenticated at the pixel level at step 131. It will be appreciated that object level authentication and pixel level authentication are both optional and can be performed in any order. The graph can then be encrypted at step 150 and transmitted at step 160 to an authorized recipient.

Figure 5:
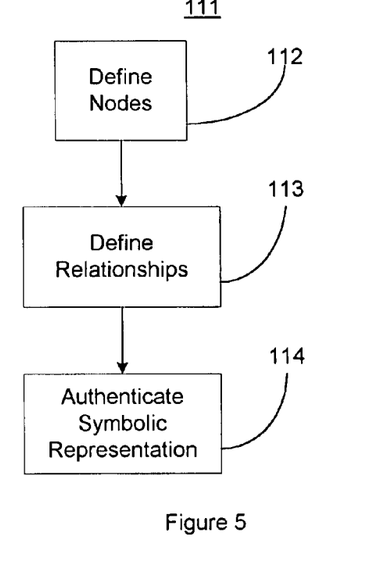
FIG. 5 is a flowchart of the process of authenticating a graph at the object level according to the present invention.

FIG. 5 shows step 111 in greater detail. It can be appreciated that nodes of the graph are defined with specification symbols at step 112. Relationships between the nodes are then defined with relationship symbols at step 113. The result is a symbolic (or object level) representation of the graphical content contained in the electronic file. It will be appreciated that other approaches to object level representation can be taken without parting form the scope of the invention. At step 114, the symbolic representation is authenticated with a text authentication algorithm.

Figure 6:
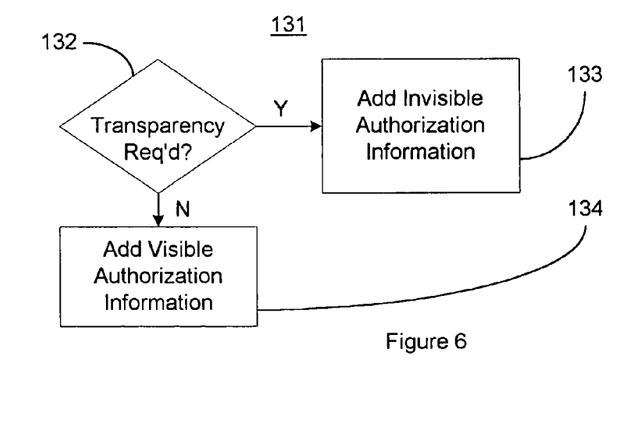
FIG. 6 is a flowchart of the process for authenticating a graph at the pixel level according to the present invention.

Turning now to FIG. 6, step 131 is shown in greater detail. At step 132, it is determined whether transparency is required based on the content of the graph and the host document. If so, invisible authorization information is added at step 133. Otherwise, visible authorization information can be added at step 134.

Figure 7:
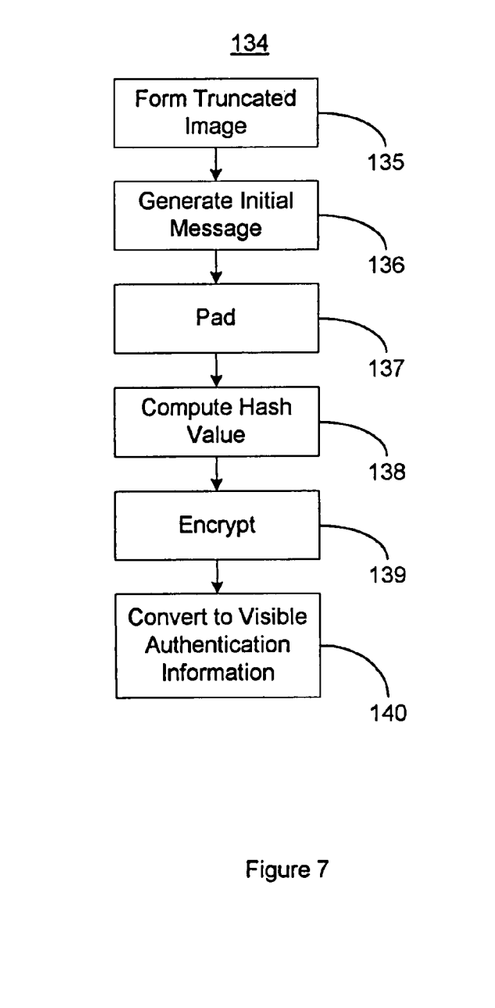
FIG. 7 is a flowchart for the process of adding visible authorization information according to the present invention.

As seen in FIG. 7, a relatively robust approach for adding visible authorization information is shown in greater detail. Specifically, at step 135 a truncated image of the graph is formed. For the following discussion, let X×Y=128 be the defined block size. Graph G can therefore be cut into X×Y blocks. Assuming the number of blocks is L, we concatenate the bits of the (x,y)th pixel of every block to the 1$^{st}$ block and form an Lbits truncated image TrunG. Therefore, a Lbits/pixel image TrunG, with image size X×Y, of graph G is generated. Let TrunG(x,y)$^l$ denote the l$^{th}$ bit of pixel (x,y) of TrunG. Notice here, it is desirable to form the truncated image TrunG in such a way that TrunG(x,y)≠0. Also note that to get a higher level of protection, a random number generator should be used to cut the graph.

At step 136, an initial message is generated from the truncated image. The initial message is defined by all bits of the truncated image. Thus, step 136 collects all bits of all X×Y pixels into a X×Y×L bits message M1. At step 137, the initial message is converted into a padded message, wherein the padded message has a size defined by a multiple of a predetermined length. Thus, M1 is padded into an exact multiple of 512 in length with as many zeros as needed to obtain message M1'.

Figure 15:
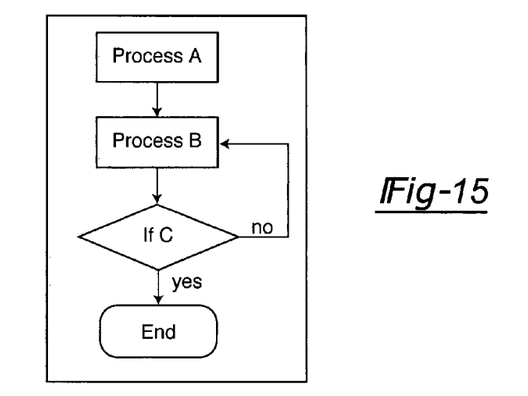
FIG. 15 is a graphical flowchart authenticated at the pixel level using a bounded box according to the present invention.
Figure 16:
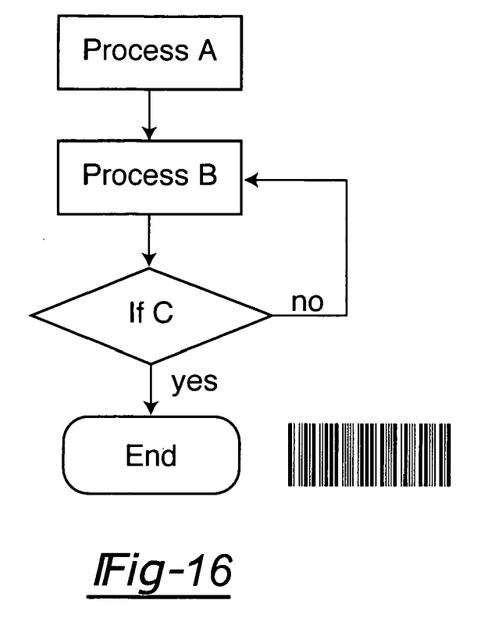
FIG. 16 is a graphical flowchart authenticated at the pixel level using a bar code according to the present invention.

At step 138, a hash value for the padded message is computed. Thus, step 138 computes the 128 bits hash value of M1' using MD5, M2=h(I)=H(M1'). At step 139, the hash value is converted into a public key encrypted message by signing the hash value with a public key cryptography method such that M3=h'(i)=Sgn(K, M2). The public key encrypted message is then converted into visible authentication information at step 140. The visible authentication information can be in many different formats. For example, FIG. 15 illustrates an authenticated graph using a bounding box, whereas FIG. 16 illustrates an authenticated graph using a bar code.

Figure 8:
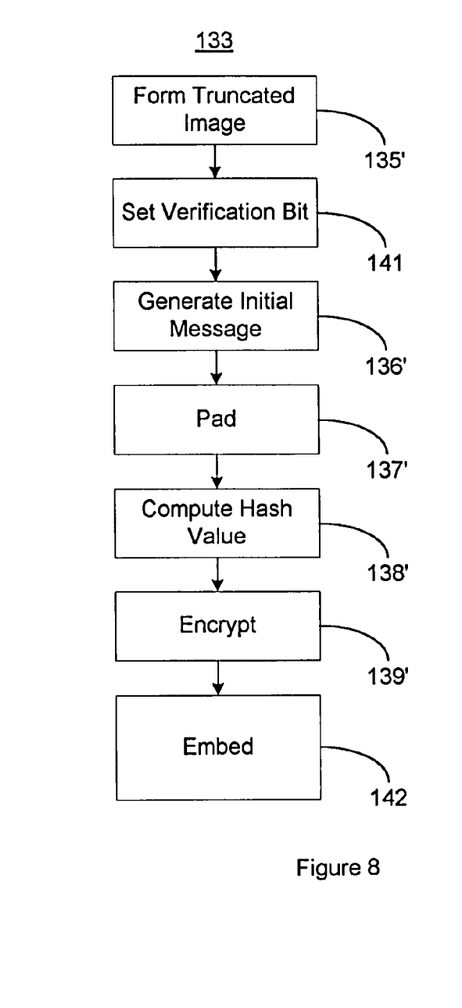
FIG. 8 is a flowchart for the process of adding invisible authorization information according to the present invention.
Figure 9A:
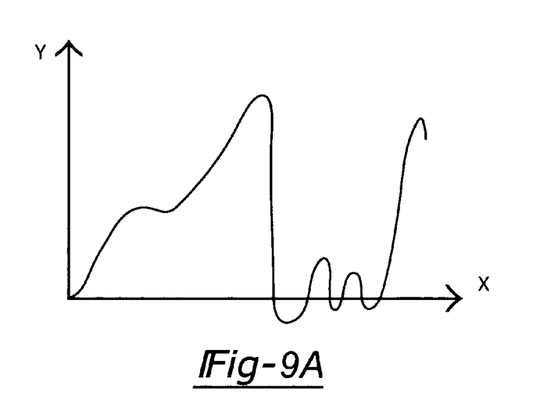
FIG. 9 is a sample illustration of graphs which can be authenticated with the present invention.
Figure 9B:
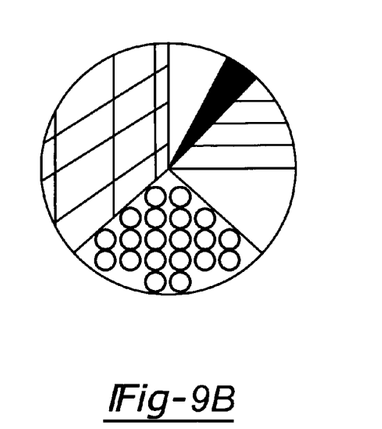
Figure 9C:
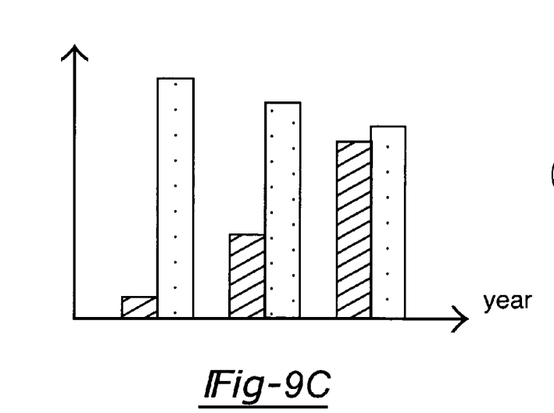
Figure 9D:
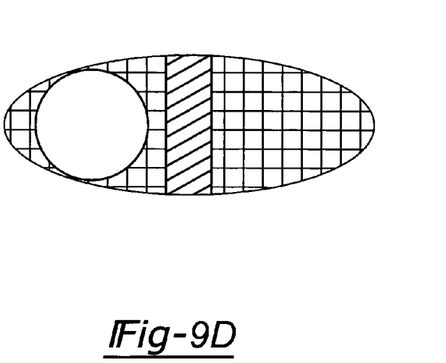

When invisible authentication is required or desirable, a less robust scheme that modifies the graph itself can be used. Thus, as shown in FIG. 8, a truncated image is formed from the graph at step 135'. At step 141, a verification bit is selected from each pixel of the truncated image. Thus, at step 141 1bit TrunG(x,y)$^l$=1 out of the Lbits of each pixel (x,y) in TrunG to be the verification bit. For better imperceptibility and a higher lever of security, the verification bits should be picked in a way to maximize spread.

At step 136' an initial message is generated from the truncated image, wherein the initial message is defined by all non-verification bits of the truncated image. Step 136' therefore collects the remaining (L−1) bits of all X×Y pixels into a X×Y×(L−1) bits message M1. Message M1 is padded into an exact multiple of 512 in length with as many 0s as needed and get message M1'. The initial message is therefore converted into a padded message at step 137'. Preferably, the padded message has a size defined by a multiple of a predetermined length of 512.

At step 138', the hash value is computed for the padded message. The hash value is then converted into a public key encrypted message at step 139'. The public key encrypted message can then be imbedded into the truncated image at step 142 in the following fashion:

If h'(i)=h'((y−1)*X+x))=0 and |TrunG(x,y)|=odd, let TrunG(x,y)$^l$=0.

If h'(i)=h'((y−1)*X+x))=1 and |TrunG(x,y)|=even, let TrunG(x,y)$^l$=1.

Where |TrunG(x,y)| denotes the cardinality of TrunG(x,y), i.e., the number of bits that are '1's among the Lbit of TrunG(x,y).

Figure 17:
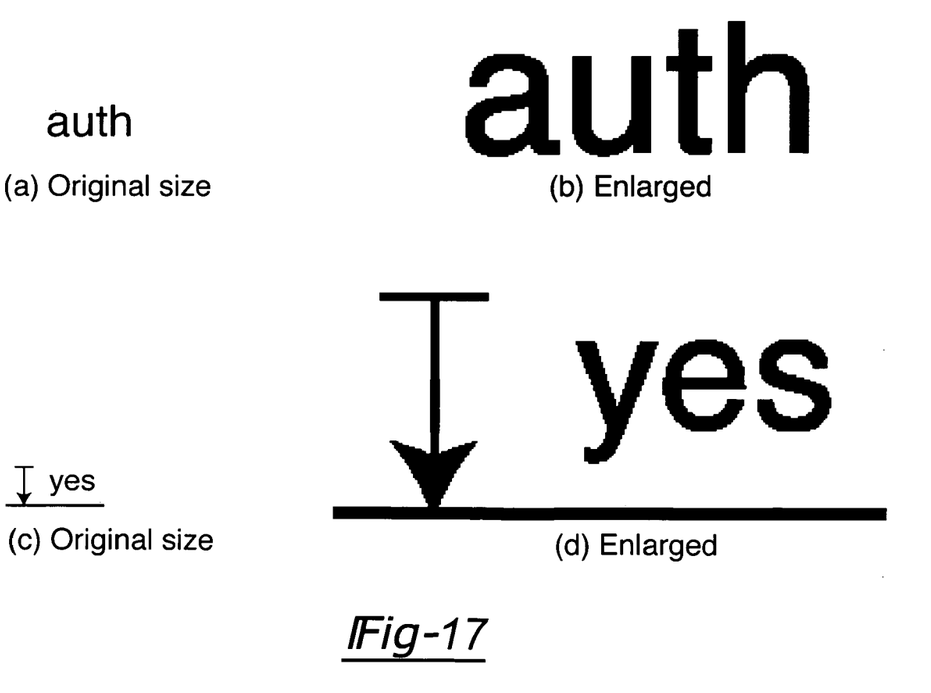
FIG. 17 is an enlarged view of textual and graphical content containing invisible authentication information.

Turning now to FIG. 17, two sample results can be seen. The lower result is cropped from the graphical flowchart in FIG. 10. To give a better view, each result is enlarged to at least 400 percent of the original size.

Figure 18:
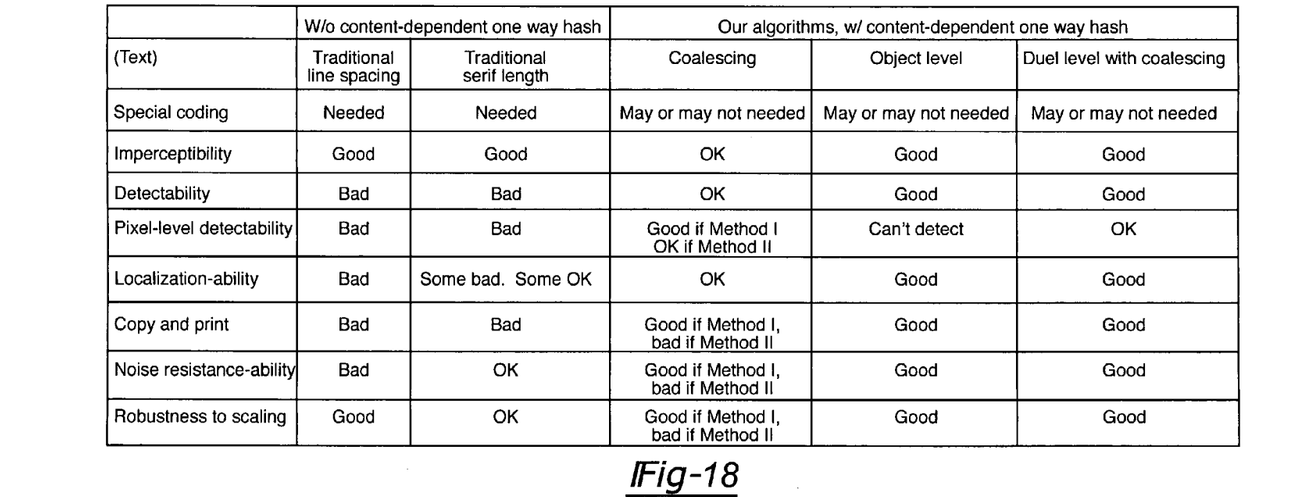
FIG. 18 is a table comparing graph authentication algorithms.

Conventional space-shifting methods and serif-modification methods are proposed in "Electronic Marking and Identification Techniques to Discourage Document Copying", J. Brassil, S. Low, N. Maxemchuk, and L. O'Gorman, IEEE Infocom 94, and in "Document Marking and Identification using Both Line and Word Shifting", S. H. Low, N. F. Maxemchuk, J. T. Brassil, and L. O'Gorman, Infocom '95, both incorporated herein by reference. Comparing these techniques to the present invention, it can be seen in FIG. 18 that clear improvement has been achieved. Notice that when the hash value is prepended to the document, special coding is not needed for object level authentication. Otherwise, such coding is needed. Similarly, in the case of pixel level or coalesced authentication, special coding is not needed with visible authentication information, whereas it is needed for invisible authentication information. Here, special coding means a new code other than commonly accepted codes, such as ASCII Code and Unicode.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A computerized method for authenticating an electronic file, the method comprising the steps of:

receiving an electronic file having a graphical content;

generating an object level representation of the graphical content;

adding authentication information to the electronic file based on the object level representation of the graphical content, wherein the graphical content contains one bit per pixel values; and authenticating the object level representation with a text authentication algorithm.

2. A computerized method for authenticating an electronic file, the method comprising the steps of:

receiving an electronic file having a graphical content;

generating an object level representation of the graphical content;

adding authentication information to the electronic file based on the object level representation of the graphical content, wherein the graphical content contains one bit per pixel values;

authenticating the object level representation with a text authentication algorithm; and authenticating the object level representation with a checksum.

3. A computerized method for authenticating an electronic file, the method comprising the steps of:
receiving an electronic file having a graphical content;
generating an object level representation of the graphical content;
adding authentication information to the electronic file based on the object level representation of the graphical content, wherein the graphical content contains one bit per pixel values;
authenticating the object level representation with a text authentication algorithm; and
authenticating the object level representation with a checksum, wherein the checksum is a two-dimensional checksum.

4. A computerized method for authenticating an electronic file, the method comprising the steps of:
receiving an electronic file having a graphical content;
generating an object level representation of the graphical content;
adding authentication information to the electronic file based on the object level representation of the graphical content, wherein the graphical content contains one bit per pixel values;
authenticating the object level representation with a text authentication algorithm; and
authenticating the object level representation with a checksum, wherein the checksum is a multi-dimensional checksum.

5. A computerized method for authenticating an electronic file, the method comprising the steps of:
receiving an electronic file having a graphical content;
generating an object level representation of the graphical content;
adding authentication information to the electronic file based on the object level representation of the graphical content, wherein the graphical content contains one bit per pixel values;
authenticating the object level representation with a text authentication algorithm; and
authenticating the object level representation with a cryptographic hash function.

6. A computerized method for authenticating an electronic file, the method comprising the steps of:
receiving an electronic file having a graphical content;
generating an object level representation of the graphical content;
adding authentication information to the electronic file based on the object level representation of the graphical content, wherein the graphical content contains one bit per pixel values;
authenticating the graphical content at a pixel level; and
adding visible authentication information to the graphical content, wherein the visible authentication information includes a bounding box.

7. A computerized method for authenticating an electronic file, the method comprising the steps of:
receiving an electronic file having a graphical content;
generating an object level representation of the graphical content;
adding authentication information to the electronic file based on the object level representation of the graphical content, wherein the graphical content contains one bit per pixel values;
authenticating the graphical content at a pixel level; and
adding visible authentication information to the graphical content, wherein the visible authentication information includes a bar code.

8. A computerized method for authenticating a binary graph, the method comprising the steps of:
authenticating the graph at a pixel level;
authenticating the graph at an object level;
encrypting the authenticated graph;
transmitting the authenticated graph to a recipient;
adding visible authentication information to the graph; and
forming a truncated image from the graph;
generating an initial message from the truncated image, the initial message defined by all bits of the truncated image;
converting the initial message into a padded message, the padded message having a size defined by a multiple of a predetermined length;
computing a hash value for the padded message;
converting the hash value into a public key encrypted message; and
converting the public key encrypted message into the visible authentication information.

9. A computerized method for authenticating a binary graph, the method comprising the steps of:
authenticating the graph at a pixel level;
authenticating the graph at an object level;
encrypting the authenticated graph;
transmitting the authenticated graph to a recipient;
adding visible authentication information to the graph; and
forming a truncated image from the graph;
generating an initial message from the truncated image, the initial message defined by all bits of the truncated image;
converting the initial message into a padded message, the padded message having a size defined by a multiple of a predetermined length;
computing a hash value for the padded message;
converting the hash value into a public key encrypted message; and
converting the public key encrypted message into the visible authentication information, wherein the visible authentication information includes a bounding box.

10. A computerized method for authenticating a binary graph, the method comprising the steps of:
authenticating the graph at a pixel level;
authenticating the graph at an object level;
encrypting the authenticated graph;
transmitting the authenticated graph to a recipient;
adding visible authentication information to the graph; and
forming a truncated image from the graph;
generating an initial message from the truncated image, the initial message defined by all bits of the truncated image;
converting the initial message into a padded message, the padded message having a size defined by a multiple of a predetermined length;
computing a hash value for the padded message;
converting the hash value into a public key encrypted message; and
converting the public key encrypted message into the visible authentication information, wherein the visible authentication information includes a bar code.

11. A computerized method for authenticating a binary graph, the method comprising the steps of:

authenticating the graph at a pixel level;
authenticating the graph at an object level;
encrypting the authenticated graph;
transmitting the authenticated graph to a recipient;
adding invisible authentication information to the graph;
forming a truncated image from the graph;
selecting a verification bit from each pixel of the truncated image;
generating an initial message from the truncated image, the initial message defined by all non-verification bits of the truncated image;
converting the initial message into a padded message, the padded message having a size defined by a multiple of a predetermined length;
computing a hash value for the padded message;
converting the hash value into a public key encrypted message; and
embedding the public key encrypted message into the truncated image.

12. A computerized method for authenticating a binary graph, the method comprising the steps of:
authenticating the graph at a pixel level;
authenticating the graph at an object level;
encrypting the authenticated graph;
transmitting the authenticated graph to a recipient;
adding invisible authentication information to the graph;
forming a truncated image from the graph;
selecting a verification bit from each pixel of the truncated image;
generating an initial message from the truncated image, the initial message defined by all non-verification bits of the truncated image;
converting the initial message into a padded message, the padded message having a size defined by a multiple of a predetermined length;
computing a hash value for the padded message;
converting the hash value into a public key encrypted message;
embedding the public key encrypted message into the truncated image; and
maximizing spread between the verification bits.

13. A computerized method for authenticating a binary graph, the method comprising the steps of:
authenticating the graph at a pixel level;
authenticating the graph at an object level;
encrypting the authenticated graph;
transmitting the authenticated graph to a recipient; and
authenticating a symbolic representation of the graph with a text authentication algorithm.

14. A computerized method for authenticating a binary graph, the method comprising the steps of:
authenticating the graph at a pixel level;
authenticating the graph at an object level;
encrypting the authenticated graph;
transmitting the authenticated graph to a recipient;
authenticating a symbolic representation of the graph with a text authentication algorithm;
defining nodes of the graph with specification symbols; and
defining relationships between the nodes of the graph with relationship symbols.

15. A computerized method for authenticating a binary graph, the method comprising the steps of:
authenticating the graph at a pixel level;
authenticating the graph at an object level;
encrypting the authenticated graph;
transmitting the authenticated graph to a recipient;
authenticating a symbolic representation of the graph with a text authentication algorithm; and
coalescing the object level of the graph with the pixel level of the graph.

* * * * *